United States Patent [19]

Seifers

[11] 4,291,296
[45] Sep. 22, 1981

[54] ENGINE DISABLING

[76] Inventor: Monte G. Seifers, 2 Vantage Way, Nashville, Tenn. 37228

[21] Appl. No.: 125,621

[22] Filed: Feb. 28, 1980

[51] Int. Cl.³ .................... B60R 25/04; B60R 25/10
[52] U.S. Cl. ................................. 340/64; 180/287;
307/10 AT; 340/63
[58] Field of Search ....................... 340/63, 64, 65;
307/10 AT; 180/287

[56] References Cited
U.S. PATENT DOCUMENTS

| 2,892,181 | 6/1959 | Benson et al. | 340/64 |
| 3,637,037 | 1/1972 | Doland et al. | 340/64 X |
| 4,159,467 | 6/1979 | Ballin | 340/64 |

Primary Examiner—John W. Caldwell, Sr.
Assistant Examiner—Joseph E. Nowicki
Attorney, Agent, or Firm—Charles Hieken

[57] ABSTRACT

A circuit for disabling a vehicle engine comprises a relay having a winding and four sets of contacts. One end of the relay winding is connected to a power terminal for connection to the vehicle ungrounded battery terminal potential. The other end of the winding is coupled to a first terminal for receiving an alarm output signal by a first diode and to ground potential through a holding set of contacts on the relay and a normally closed reset switch. A second terminal for connection to a horn relay is coupled to the first terminal by a second diode poled opposite to the first diode. A first common terminal and second output terminal are intercoupled by relay contacts for establishing a normally closed path therebetween. A third output terminal is intercoupled by the relay contacts for establishing a normally open path between the first and third terminals.

4 Claims, 1 Drawing Figure

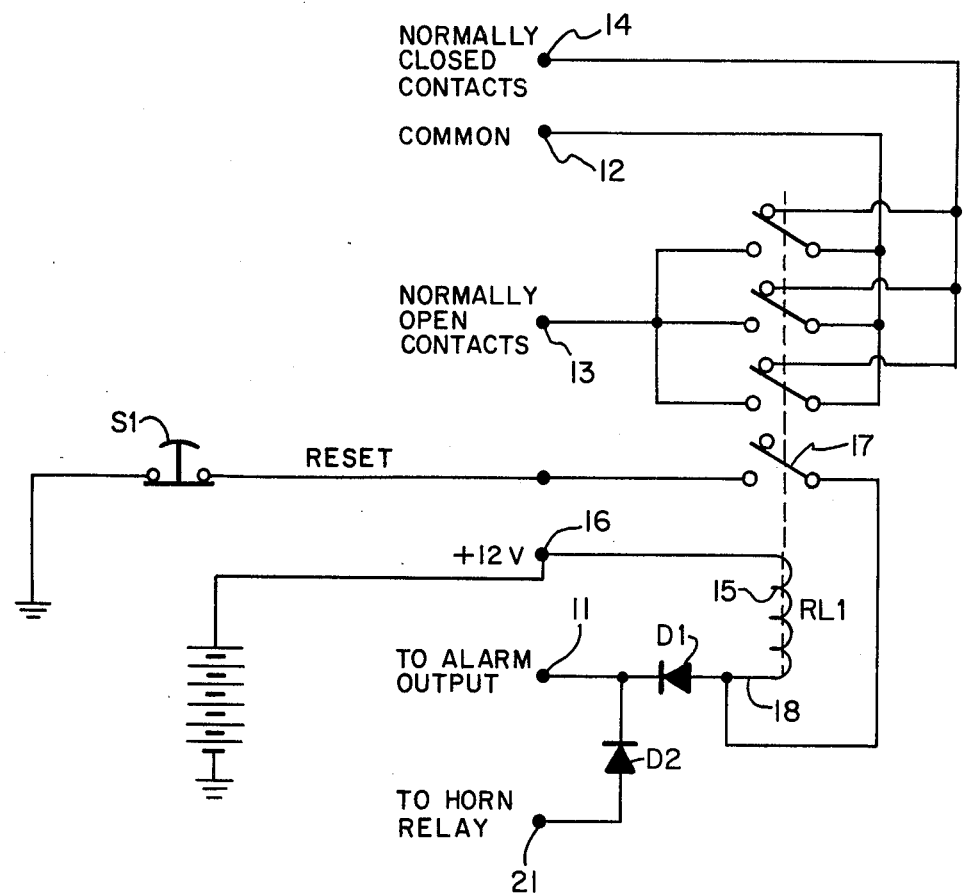

ENGINE DISABLING

BACKGROUND OF THE INVENTION

The present invention relates in general to engine disabling and more paticularly concerns novel apparatus and techniques that coact with a vehicle alarm to disable the engine upon the occurrence of an alarm condition and thereby help prevent the vehicle from being stolen.

It is an important object of the invention to provide improved means for disabling an engine to help prevent vehicle theft. It is another object of the invention to achieve the preceding object with reliable apparatus that is relatively free from complexity.

It is still a further object of the invention to achieve one or more of the preceding objects while preventing normal beeping of a vehicle horn that is also used to provide an audible indication of an alarm condition from disabling the engine.

It is another object of the invention to achieve one or more of the preceding objects while providing a convenient means for enabling the engine.

SUMMARY OF THE INVENTION

According to the invention, there is relay means having one end of a relay winding connected to a source of operating potential and the other end connected to an alarm output through a unilaterally conducting device poled to allow current to flow through the relay winding when the alarm output is at a potential corresponding to the existence of an alarm condition, such as being grounded. This alarm output terminal is connected to the vehicle horn relay through unilaterally conducting means poled to allow the flow of current through the horn relay when the alarm output is at a potential corresponding to an alarm condition, such as ground potential. There are holding contact means connected between the winding other terminal and a common terminal through normally closed reset switching means for keeping the relay means operated until the reset switching means is opened following the occurrence of an alarm condition. The relay means also includes at least an additional set of contacts for electrical connection to the engine for disabling engine operation when the relay is operated. Preferably, the relay means includes a number of redundant sets of contacts to insure reliable operation and preferably includes both normally closed and normally open contacts to accommodate a wide variety of engine disabling conditions.

Numerous other features, objects and advantages of the invention will be better understood from the following specification when read in connection with the accompanying drawing.

BRIEF DESCRIPTION OF THE DRAWING

The single FIGURE of which is a schematic circuit diagram of a preferred embodiment of the invention.

DETAILED DESCRIPTION OF PREFERRED EMBODIMENTS

With reference now to the drawing, there is shown a schematic circuit diagram of a preferred embodiment of the invention in which occurrence of an alarm condition on alarm output terminal 11 operates relay RL1 to interconnect common terminal 12 and normally open contacts terminal 13 while disconnecting common terminal 12 and normally closed contacts terminal 14. The normally closed contacts may be connected in series with the ignition circuit to prevent the spark plugs from firing when the relay is operated or may be in series with an electrically operated fuel pump to prevent the delivery of fuel when the relay is operated. Alternatively, terminals 12 and 13 may be connected across the primary of the ignition transformer to prevent the spark plugs from being ignited. These terminals may be otherwise connected to the engine to prevent and permit operation when relay RL1 is operated and not operated, respectively.

One end of the winding 15 of relay RL1 is connected to the vehicle battery potential, typically twelve volts, on terminal 16. The other end is connected through holding contacts 17 and reset switch S1 to ground. This end 18 is also connected by diode D1 to the alarm output terminal 11. Alarm output terminal 11 is connected to horn relay terminal 21 by diode D2. These diodes coact so that upon occurrence of an alarm condition both diodes conduct to operate the horn relay and relay RL1, and once relay RL1 is operated, holding contacts 17 maintain it in the operated condition until switch S1 is opened. Switch S1 may be concealed in the vehicle so that only the vehicle operator readily knows its location for deenergizing relay RL1 and allowing the engine to operate. If the horn relay connected to terminal 21 is operated by the horn ring, diode D2 prevents the grounding of terminal 21 from operating relay RL1. Diode D1 prevents the ground connected to winding end 18 through switch S1 and latching contacts 17 from operating the horn relay.

The use of three redundant contacts minimizes the chances that the engine will be disabled because of defective relay contacts.

There has been described novel apparatus and techniques for disabling an engine upon occurrence of an alarm condition and preventing restoration until the vehicle operator operates a concealed reset switch. The apparatus is rugged, reliable and economical. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Vehicle engine disabling apparatus comprising,
    a first terminal for receiving an alarm output signal,
    a second terminal for connection to a horn relay,
    a common terminal,
    relay means having a winding with first and second ends and latching and at least one other set of contacts,
    a power terminal for receiving electrical potential from a source thereof connected between said power terminal and said common terminal,
    said first end of said winding connected to said power terminal,
    normally closed reset switching means for selectively interrupting current flow to said winding.
    means including a first unilaterally conducting device for coupling said second end of said winding to said first terminal, means including a second unilaterally conducting device for coupling said first terminal to said second terminal, means including said latching contacts on said relay means and said reset switching means connecting said common terminal to said second end of said winding for maintaining said relay means operated in response to the occurrence of an alarm signal on said first terminal until said reset switching means is open.

said first and second unilaterally conducting devices being oppositely poled so that said first unilaterally conducting device prevents said second terminal from receiving a horn relay operating potential and said second unilaterally conducting device prevents operation of said relay means upon the occurrence of a potential on said second terminal for operating a horn relay produced by manual actuation of a horn switch by a vehicle driver, and at least first and second output terminals intercoupled by a first of said other set of contacts for connection to a vehicle engine electrical system for disabling the vehicle engine when said relay means is operated and allowing operation of the vehicle engine when said relay means is not operated.

2. Vehicle engine disabling apparatus in accordance with claim 1 and further comprising a third output terminal connected to at least one of said contacts and means for establishing a normally open path between said first and third output terminals when said relay means is not operated and between said first and second output terminals a normally closed path therebetween when said relay means is not operated.

3. Vehicle engine disabling apparatus in accordance with claim 2 wherein there are a plurality of said other sets of contacts connected in parallel.

4. Vehicle engine disabling apparatus in accordance with claim 1 wherein said normally closed reset switching means is in series with said latching contacts for restoring said relay means to the nonoperated condition.

* * * * *